Patented Mar. 21, 1939

2,151,006

UNITED STATES PATENT OFFICE 2,151,006

COATING COMPOSITION

Walter H. Beisler, Towson, Md., assignor to Crown Cork & Seal Company, Inc., Baltimore, Md., a corporation of New York No Drawing. Application June 15, 1936, Serial No. 85,382

1 Claim. (Cl. 134—26)

The present invention relates to varnishes, paints, lacquers, inks, and coatings which include a suitable drying oil.

While linseed oil has been, and in many cases is still, preferred as a drying oil, it presents the objections that it is slow drying, frequently does not impart the desired water resistance to the coating, and, by reason of its retarded drying action, forms films which are soft and tacky. It has been suggested as a substitute for linseed oil to use drying oils such as China-wood oil or oiticica oil.

These oils are relatively quick drying, water resistant, and the dried films are devoid of plastic or adhesive characteristics. However, the oils present the difficulty that the films are not gas-proof, i. e., they crystallize or check and often present a frosted appearance, particularly where the films are dried in the presence of products of combustion, as in a gas oven. That is to say, films, for example of pure tung oil which have not been suitably modified, are acted upon by products of combustion in a manner to prevent obtaining a smooth and continuous film. This action has been explained as due to the activity of nitrogen dioxide upon the tung oil film. It is to be understood, of course, that checking, frosting, or crystallizing renders the film useless for many applications.

It is, therefore, an object of this invention to form films from drying oils, such as China-wood oil or oiticica oil, which are gas-proof.

It is also the aim of the invention to produce films, whether dried in the air or in an atmosphere containing products of combustion, which will be smooth, continuous, and glossy; and transparent if pigments are not used.

In carrying out the present invention I use modifying agents for the drying oil which are employed in small percentage, do not appreciably affect the drying rate of the film, and enable the film to be air dried and dried in a gas fired oven at a relatively low temperature without danger of checking or crystallizing. I have found it advantageous to use p-hydroxydiphenyl and o-hydroxydiphenyl, and, by critically controlling the forming of the mixture, the compositions prepared according to this invention produce gas-proof films.

I have discovered that the usual driers, for example, manganese (.015% based on the tung oil) will produce a good film with tung oil if the baking temperatures are sufficiently high, namely 230° F. or above. Also, I have discovered that by using 2% of p-hydroxydiphenyl (based on the tung oil) without drier produces a good film at 230° F. or above. In each case, however, it is necessary to use a high temperature, since any temperature substantially lower than that mentioned will result in a checked film. Moreover, where the p-hydroxydiphenyl is used alone, the amount of this chemical required is objectionable as to cost.

In order to produce a satisfactory coating composition, capable of being dried at lower temperatures and with resultant saving in expense of fuel, as well as chemical, I have discovered that by using both a drier and a modifying agent in critical amounts with relation to the drying oil, lower temperatures can be employed to produce a gas-proof film.

For example, I have discovered that by using .03% drier, such as manganese, with 0.5% of p-hydroxydiphenyl (based on tung oil) that satisfactory films are produced as low as 190° F.

In preparing a coating composition, the tung oil is bodied by heating in accordance with the following schedule:

| Minutes from start | Temperature (°F.) | Minutes from start | Temperature (°F.) |
| --- | --- | --- | --- |
| 5 | 190 | 20 | 430 |
| 10 | 300 | 25 | 500 |
| 15 | 365 | 30 | 560 |

The bodied oil is cooled quickly to a temperature of about 250° F. optimum for solution of the modifying agent, e. g., p-hydroxydiphenyl, and the same is added in suitable percentage. The cooling of the tung oil is carried out under conditions to preserve its liquid state.

The mixture is cooled to substantially room temperature and under conditions to maintain its fluidity and is mixed with any other desired components to form the coating composition.

For example, in the manufacture of so-called lithographic varnish, upon addition of a suitable drier, such as cobalt, manganese, etc., the product is completed.

Where varnishes of the oleo-resin type are being made, there is added to the modified tung oil mixture the desired percentages of drier and resin, the latter usually in solution in a suitable thinner.

The varnishes above described may or may not include the customary pigments.

These varnishes, when dried in a gas oven, will form films which are smooth, continuous, hard, and waterproof and, notwithstanding their exposure to products of combustion, will remain free from checking.

While I have referred herein to bodied tung oil, it will be understood that other oils, such as bodied oiticica, will be treated in substantially the same manner and the resultant films will possess similar characteristics.

Also, while I have referred to p-hydroxydiphenyl which is preferred, o-hydroxydiphenyl is satisfactory.

In addition to the modifying agents just described, I also find it useful to employ in some cases a liquid alkyd resin. I prefer a resin of the following composition:

Glycerine _____ (½ mol) __ 46 g.
Phthalic anhydride_____ (⅜ mol) __ 55.5 g.
Linseed fatty acids _____ (¾ mol) __ 210 g.

In certain instances I include in addition about 10% of a 100% phenolic resin or 1% p-hydroxydiphenyl, based on the alkyd resin.

In preparing the alkyd resin, the glycerine, phthalic anhydride and fatty acids are heated together at 500° F. for thirty minutes after which the product is cooled under conditions to maintain it liquid. Where the phenolic resin such as cresol-formaldehyde, or p-hydroxydiphenyl is also used, the same is preferably added at the end of the heating period and the resin cooled as described.

In preparing the composition, about one part alkyd resin in its cooled state, usually at room temperature, is added to 2 to 4 parts tung oil bodied as described above and serves to cool the same rapidly and in a manner to preserve its liquid state. Where the 100% phenolic resin is used, it may be added with the alkyd resin or it may be added to the resin-drying oil composition, and in a similar manner, the p-hydroxydiphenyl is included in the composition. Where a drier such as cobalt, manganese, etc., is used, it is added to the oil-resin mixture after the same has cooled to about room temperature.

I find that an excellent gas-proof composition is formed when the concentration of p-hydroxydiphenyl is about 0.5% (based on the tung oil) and when the composition contains a drier such as manganese in about .015% (based on the tung oil-resin composition). Such a coating is highly advantageous, in that the film dries at a relatively low temperature in a gas-fired oven, e. g., 190° F. or above, and is free of gas checking. The percentages of p-hydroxydiphenyl and drier in this composition are critical.

In this connection, I find that where the resin-oil composition contains 2% of p-hydroxydiphenyl (based on tung oil) and no drier, a satisfactory film is obtained by drying at or above 230° F. in a gas-fired oven; that where the oil-resin composition contains 5% of a 100% phenolic resin (based on tung oil), the film, if dried at or above 230° F. in the oven, is likewise good, and the latter composition, when manganese in about .015% (based on the oil-resin) is used, dries satisfactorily in the oven at or above 210° F. From these tests, it will be noted that p-hydroxydiphenyl is very efficient as a gas-proofing agent, especially in association with alkyd resins and driers and that where the percentage relationship of the drier and p-hydroxydiphenyl are critically controlled, gas-proof films under extreme conditions of gas oven drying are obtainable at a relatively low drying temperature, e. g., 190° F.

Pigments may, of course, be added as desired to any of the compositions. Bodied oiticica oil may be used instead of tung oil, and o-hydroxydiphenyl may be employed in lieu of p-hydroxydiphenyl, under substantially the same conditions, and this is likewise true as to the driers, in that lead, manganese, cobalt, etc., are useful.

A composition made up of 2 parts of oiticica oil and about 1 part of alkyd resin forms satisfactory films at or above 190° F., providing the composition contains about 0.015% manganese; no other modifying agent need be used.

In connection with the preferred baking compositions described herein even lower baking temperatures than those given may be used in the gas oven, providing the amount of drier or modifying agent or both are increased.

I have discovered that satisfactory coating compositions can be made which will dry in the air under ordinary atmospheric conditions and produce a gas-proof film if the constituents are critically controlled.

As one example, I mix 2 to 4 parts of tung oil bodied as above described with 1 part of the alkyd resin mentioned herein and containing 0.75% of p-hydroxydiphenyl (based on the tung oil) with about .025% cobalt and .11% manganese (based on the oil-resin).

Also, where the composition does not include the alkyd resin, a satisfactory air dried and gas-proof film is produced by adding to the tung oil about 4% p-hydroxydiphenyl (based on the tung oil) and driers in the amounts just described. The composition is prepared as above set forth.

I find that similar air drying gas-proof films are produced if, in either of the two beforementioned examples the same precentages of o-hydroxydiphenyl are used instead of p-hydroxydiphenyl.

It will be noted that the p- and o-hydroxydiphenyl are very much more effective when used in combination with an alkyd resin than when the latter is omitted. In other words, and as pointed out in connection with oven dried films, I have discovered that by using an alkyd resin relatively small percentages of the p- or o-hydroxydiphenyl need be used to obtain an air drying gas-proof film.

Similar satisfactory air drying gas-proof films are obtained if, in the previous examples, alpha-naphthylamine is used instead of p- or o-hydroxydiphenyl and in the amount of about 2%, based on the tung oil in each case. The presence of the alkyd resin does not alter the quantity of the alpha-naphthylamine required.

In using oiticica oil instead of tung oil in the above examples, for preparing air drying gas-proof films, where the alkyd resin is used, the p-hydroxydiphenyl is preferably present in about 2.5% (based on the tung oil). This same percentage is used where the alkyd resin is omitted, but in some cases I slightly increase the amount of cobalt drier. Where o-hydroxydiphenyl is employed with oiticica oil and the alkyd resin, it is preferably employed in about 3.5% (based on the oiticica oil) and in the same percentage when the alkyd resin is omitted, although as before stated I sometimes, in the latter instance, slightly increase the quantity of cobalt drier.

Alpha-naphthylamine is also useful with oiticica oil in accordance with the above examples, and where the composition includes the alkyd resin, I preferably employ about 4% alpha-naphthylamine based on the oil, but in some cases the amount of cobalt drier is decreased slightly. Similar percentages of alpha-naphthylamine and drier are used where the alkyd resin is omitted.

I have also used beta-naphthol as a modifying agent for tung and oiticica oils. In making air dried and gas-proof films with such oils, in absence of alkyd resin, about 8% of beta-naphthol is required, and, where the alkyd resin is included, about 5% beta-naphthol is sufficient. Where the films are to be dried in a gas-fired oven, beta-naphthol must be present in excess of 8% (based on the oil) in order to secure gas-proofness at 230° F. in absence of alkyd resin. Similar films are obtained at 230° F., where the alkyd resin is included, when beta-naphthol in excess of 8% (based on the tung oil), or in amount of about 3% (based on the oiticica oil), is used. These percentages are based on the use of driers in the amount of about 0.03% cobalt and 0.15% manganese in case of air dried films, and no drier for the baked films.

In connection with the use of tung oil herein, it is to be understood that this is carefully bodied in the case of lithographic varnishes, so as to have a required state of fluidity. The conditions described above for bodying tung oil are, therefore, critical where the tung oil is to be used for this purpose. However, in case greater fluidity is desired, the temperature is increased through shorter time intervals and if a high viscosity is desired, the heating periods are extended for a longer time. While I have described one method of bodying tung oil, other ways of accomplishing this result may be used, e. g., for some varnishes the oil is heated at 400° F. for one or more hours.

In the cooling of the tung oil, particularly in the case of lithographic varnishes, where it is desired to maintain fluidity, various methods may be employed as for example, flowing the oil through a cooling coil or other rapid cooling means. Also, non-frosting oils may be added to effect the rapid or quick cooling, such, for example, as perilla oil or linseed oil. In this connection, linseed oil, perilla oil, soya bean oil, or other slower drying oils, may be added to some of the compositions above described for the purpose of slowing up the drying action wherever desired.

I have found that the use of p- and o-hydroxydiphenyl, as well as beta-naphthol, in small percentages, do not substantially effect the rate of drying of the films. On the other hand, alpha-naphthylamine tends to accelerate the drying.

In addition to the several compositions above described, it is to be understood that the modifying agents are useful with oleo-resin varnishes or lacquers which are deficient in gas-proofness. Thus, by adding a proper, critically controlled amount of p- or o-hydroxydiphenyl, I am enabled to impart satisfactory gas-proofness to films made of such oleo-resin compositions. As one example, I prepare a varnish of the following composition:

Tung oil _____ grams__ 360
Phenol formaldehyde resin (amberol B/S-1 light) _____ grams__ 100
Alkyd resin (as above described) _____ do____ 75
Mineral thinner _____ cc___ 400

The oil and phenol resin are heated to 580° in about thirty minutes, the source of heat removed, and the alkyd resin is then stirred into the mixture. The mixture is thinned as desired, the mineral thinner being usually some suitable petroleum distillate.

This varnish is not gas-proof. However, by adding to the varnish about 1 per cent (based on the tung oil) of p- or o-hydroxydiphenyl, the varnish is rendered gas-proof both in air and when subjected to products of combustion as in a gas-fired oven.

As pointed out above, the alkyd resin is quite effective in reducing the quantity of gas-proofing agent necessary as illustrated when the alkyd resin is omitted from the above varnish composition. Under such conditions there is required more than 3 per cent of p-hydroxydiphenyl or more than 5 per cent o-hydroxydiphenyl in order to secure a gas-proof composition.

The same results obtain in case of oiticica oil as illustrated by the following example:

Oiticica oil _____ grams__ 300
Amberol 801 extra light (maleic type) _ do____ 50
Alkyd resin (as above mentioned) ____ do____ 75
Mineral thinner (petroleum distillate) __cc__ 350

The oil and resin (maleic type) are heated to 590° in about thirty minutes, the source of heat is removed, and the alkyd resin is then stirred into the mixture. The mixture is thinned as desired.

Gas-proofness is obtained with the above varnish by using 3 per cent p- or o-hydroxydiphenyl or alpha-naphthylamine (based on the tung oil).

In addition to the types of resins given in the above examples, other varnish resins, e. g., synthetic, such as the cumars, semi-synthetic, such as ester gum and natural, such as the copals, may be used.

In addition to the modifying agents above described, such as p- and o-hydroxydiphenyl, alpha-naphthylamine, beta-naphthol, all of which exhibit different properties and characteristics including their ability to gas-proof coating compositions, I have used carbazol and 1,5-dihydroxynaphthalene under critical conditions as set forth.

By "quick drying oil" in the appended claim, I mean a drying oil of the type which, unless suitably modified, exhibits a checked, crystallized, frosted or matted appearance when dried as a film either in the air or in the presence of products of combustion.

I claim:

A coating composition drying at a temperature as low as 190° F. in a gas fired oven and without formation of checks or crystallization comprising bodied tung oil and 0.5% hydroxydiphenyl and .03% metallic drier based on the weight of the tung oil.

WALTER H. BEISLER.